United States Patent [19]

Kock

[11] 4,359,480

[45] Nov. 16, 1982

[54] PRODUCTION OF A SOYBEAN MEAL

[75] Inventor: Manfred Kock, Emmerich, Fed. Rep. of Germany

[73] Assignee: Akzo N.V., Arnhem, Netherlands

[21] Appl. No.: 292,011

[22] Filed: Aug. 11, 1981

Related U.S. Application Data

[63] Continuation-in-part of Ser. No. 132,152, Mar. 20, 1980, abandoned, which is a continuation of Ser. No. 904,435, May 17, 1977, abandoned.

[30] Foreign Application Priority Data

May 17, 1977 [DE] Fed. Rep. of Germany ....... 2722246

[51] Int. Cl.$^3$ ............................................. A23L 1/20
[52] U.S. Cl. .................................... 426/430; 426/634; 426/456; 426/466; 426/507; 426/511; 426/519
[58] Field of Search ............... 426/242, 634, 430, 456, 426/467, 507, 511, 520, 519, 465, 466

[56] References Cited

U.S. PATENT DOCUMENTS

| | | | |
|---|---|---|---|
| 2,710,258 | 6/1955 | Kruse | 426/634 |
| 2,726,155 | 12/1955 | King et al. | 426/634 |
| 3,141,777 | 7/1964 | Guidarelli et al. | 426/242 |
| 3,155,524 | 11/1964 | Norris et al. | 426/634 |
| 4,008,210 | 2/1977 | Steele et al. | 426/430 X |

*Primary Examiner*—Robert A. Yoncoskie
*Attorney, Agent, or Firm*—John H. Shurtleff

[57] ABSTRACT

Method for producing edible soybean meal which is essentially free from bitter taste by moistening pieces, e.g., small flakes, of soybeans to increase their water content to 12 to 25%, heat treating the moistened pieces at 90°–120° C. while subjecting them to a slow, compacting mechanical movement sufficient to achieve a minimum bulk weight of at least about 400 kg/m$^3$, thereafter extracting soybean oil from the pieces with a non-polar solvent, and drying the soybean pieces to obtain soybean meal which is essentially without bitter taste.

10 Claims, No Drawings

PRODUCTION OF A SOYBEAN MEAL

RELATED APPLICATIONS

This application is a continuation-in-part of my co-pending parent application, Ser. No. 132,152, filed Mar. 20, 1980, now abandoned, which in turn is a continuation of my application Ser. No. 904,435, filed May 17, 1977, now abandoned.

BACKGROUND OF THE INVENTION

The invention relates to a method for producing soybean meal, which is essentially free of bitter taste. The soybean is probably the best known and most versatile oil crop. In recent years it has gained considerable nutritional importance as a source of vegetable fat and a source of protein. The content of oil and protein varies, depending on the origin of the beans. The oil content lies generally between 15 and 21% whereas the protein content is 35% and more. The soybean is also the chief raw material for the production of vegetable phosphatides, e.g., lecithin, which are used in foods and in other technological areas.

For the processing, the beans are first precleaned where everything which is larger than the beans is removed. Subsequently, everything which is smaller than the soybeans is removed, as well as iron particles which are removed by magnetic cleaning devices. If the water content is more than 10%, drying to a water content of 8 to 10% usually is carried out before the beans are crushed by way of grooved crushing rolls. The crushed soybeans are then rolled on mills into small flakes as thin as possible. Then the flakes are fed to the extractors where soybean oil is extracted from the flakes by means of extraction agents. The residual meal, loaded with the extracting solvent, is removed from the extractors, freed of the solvent, dried, ground and cooled.

For soybeans, the oil-bearing seed predominantly processed by extraction systems today, the separation of solvent from extraction residues is of decisive importance since the value of the meal depends on it. Distillation or evaporation of the solvent by heat is carried out in a step called toasting, in order to render ineffective certain harmful components such as enzymes and to convert the protein into an easily digestible state. The meal, which is still solvent-moist, enters the dome of a toaster and passes downwardly through one after another of the individual levels, with the depth of the layer remaining the same at each level. Steam is blown into the toaster, which brings about the vaporization of the solvent and moistens the soy material additionally with the water of condensation. The following levels are equipped with indirect heating means. Here the actual toasting begins, which is preferably carried out at temperatures from 102° to 105° C. while predetermined moisture contents and times of stay are maintained. The effectiveness of the toasting process is evaluated by measuring the urease activity. This processing method is generally used today and in principle it is used in association with all extraction systems in the same general manner.

In order to achieve extraction as complete as possible, a looser packing of the small soy flakes—thus less bulk weight—has always been desirable in known processes. Likewise, any unecessary thermal stress before the extraction is to be avoided in order to preclude denaturation of the soy protein and thermal oxidation damage of the soybean oil which is not yet extracted. The separated meal still contains bitter components whose presence has always prevented the use of soybean meal for human food up to now.

It is an object of the present invention to produce a soybean meal which is largely free from bitter components, has a high content of digestible protein and is optimally free from the raw soybean oil and phosphatides.

As set forth herein, this object is achieved by a method wherein the soybean pieces in the form of crushed and rolled flakes, before extraction takes place, are first moistened, preferably by direct application of steam under fast mixing, to a water content of 12 to 25 weight percent, are then subjected to a heat treatment at temperatures of 90° to 120° C. under a slow, compacting mechanical movement sufficient to achieve a minimum bulk weight of at least about 400 kg/m$^3$ and are subsequently freed of the raw soybean oil by extraction with a non-polar extraction solvent. The residual solvent is then removed by a conventional drying or toasting step.

The soy pieces are preferably moistened to a water content of 14 to 20 weight percent, especially about 15–16% by weight, under a steam atmosphere. Both the moistening and heat treatment are appropriately carried out in a tower which has plates with steam coils at several levels. The upper entry portion may be provided with apparatus for the moistening. The slow mechanical movement of the material which occurs during the heat treatment can be continued during an initial drying after the heat-treatment and also during the extraction. The initial drying takes place to such an extent that the usual water content for extraction is reached, e.g. between 8 and 14 weight percent, preferably about 12% by wt.

Good results are obtained especially if, contrary to prevailing opinion, the soybeans are slowly mechanically moved during the heat treatment until a bulk weight of at least 400 kg/m$^3$, preferably over 500 kg/m$^3$, is reached and the soy material with this high bulk weight is then used in the extraction. For this purpose, stirring paddles can be installed in the mentioned tower over which move the soy material over the plates at various levels or in tiers, where the soy material falls from each level through tubes or the like to the next lower level. In order to effectively increase the bulk weight, i.e. so as to compact the soybean flakes to a higher density during the heat treatment step, it will be understood that a slow, gentle and compacting movement of a paddle mixer, stirrer or similar mixing means is required, for example, using a rotational speed of less than one rotation per second, i.e. less than about 60 r.p.m. Preferred rotational periods are about 2–6 seconds for each revolution, i.e. speeds of about 10 to 30 r.p.m.

In a preferred form of the invention, hydrocarbons containing 5 to 12 carbon atoms in the molecule are used, either singly or in a mixture, as the extraction solvent. Pentane, hexane, cyclohexane, heptane, nonane, octane and light benzine having a boiling range of 65° to 85° C. are examples of technically pure solvents which are especially useful for the extraction.

It proved to be favorable if the moistening and the heat treatment are carried out with small soybean flakes, which had been rolled in the crushing mills, because a treatment time of 10–45 minutes then suffices for the heat treatment.

Moistening may be accomplished with steam which is blown directly on the soy material. The steam, on the one hand, heats the soy material to the temperatures of the heat treatment and, on the other hand, moistens the soy material with water of condensation in the desired manner. This initial moistening and preheating of the soybean material is desirably carried out very rapidly, e.g. at mixing speeds above about 200 r.p.m. and within about 10 seconds or less.

In the method of the invention it is desirable to separate the residual extraction solvent from the soybean meal in a known meal toasting step.

The raw oil produced from the extraction phase was obtained in a form in which soybean oil and lecithin can be separated especially well and quantitatively. The lecithin yield is about 1.2 weight percent, with reference to the soybean charge.

Compared to a soybean meal which has been produced according to previously known methods, the great advantage of the method of the present invention resides on the recovery of a soybean meal with a low content of bitter components, so that it may be used as food intended for human consumption.

The special flake structure and the attainable higher bulk weight provide clear advantages for the storing and transportation of the meal due to better flowability and lower space requirements. Another advantage of the method of the invention arises from the notably increased yield and quality of the extracted products.

Compared to previously well known methods, the present invention provides an increase in the yield of extracted oil of 0.6% by weight with reference to the soybeans charged. The quantity of recovered lecithin is relatively large, and amounts of up to 1.2% by weight, with reference to the soybeans charged, are achieved.

A preferred embodiment of the invention and a number of comparisons are set forth in the following examples.

EXAMPLE 1

After the usual preliminary cleaning, such as sieving and sifting in order to remove foreign substances, soybeans were crushed on grooved rolls and subsequently rolled on smooth rolls on which the crushed bean pieces were rolled into thin, small flakes having a diameter of about 0.25 mm. By means of direct steam, the soy flakes were moistened at the rate of production of approximately 400 tons per day to a water content of 16 weight percent under constant mechanical movement in a fast running paddle mixer (400 r.p.m.). They were subsequently transferred to a tower which on several levels contained divider trays with steam coils which heated the soy material on the trays to temperatures of about 100° C. By means of slow-operating stirring paddles, the soy material was moved from tray to tray by way of drop shafts while being compacted under the action of the slowly moving stirring paddles.

The material was dried to a moisture content of 12% whereupon extraction took place. The time of stay in the tower lasted about 30 minutes and the soy material supplied for extraction had a bulk weight of 475 kg/m$^3$.

On a belt extractor, the material was extracted with technical hexane to a residual oil content of the soybean flakes of approximately 1% by weight. The entire extraction time was about half an hour.

The extracted flakes were freed of the extraction agent in a conventional toaster in a well known manner. After the separation of the extraction agent, a valuable soybean meal was obtained, with residual oil content of 1% by weight, a bulk weight of 635 kg/m$^3$ and 44% by weight of protein. The urease activity was less than 0.1.

The soybean meal was tested organoleptically for the presence of bitter taste components by a group of tasters trained in the evaluation of the taste of edible oils. Compared to soybean meal produced by previous known methods, a detectable improvement of taste was noted.

EXAMPLE 2

A number of comparisons were carried out, using a heated tower with six steam heated trays arranged at different levels in order to provide several heating stages. Each stage was equipped with a slowly running paddle mixer in order to ensure a gradual compacting of the soybean flakes during their movement over the heating stages. The speed of rotation of the mixer in each stage was three seconds per revolution, i.e. one revolution every three seconds or about 20 r.p.m. The height of the soybean flakes on each tray amounted to about 60 cm. The total retention time of the flakes in the tower was about 30 minutes.

The overall process was first carried out according to the invention, as shown by the including steps wherein the raw soybeans were first broken into particles on grooved breaking rolls A and then rolled into flakes on smooth crushing rolls B. The resulting flakes were then transported by a screw conveyor C into a rapidly operated (400 r.p.m.) paddle mixer D equipped with a direct supply of steam in order to rapidly moisten the flakes under a steam atmosphere and to quickly heat them up to a temperature of 95° C., e.g. within approximately one second. These initially heated and moistened flakes were permitted to fall into the upper end of a vertical tower E having six treatment stages E1 through E6, represented by conventional retaining trays with openings along one side to permit a gradual flow of the flakes downwardly from one stage to the next under the influence of the slowly rotated paddle mixer in each stage. Steam coils in each tray kept the temperature within the flakes at about 105° C. The flakes were drawn off from the final treatment stage E6 into a screw discharge conveyor F and transported into a drying and cooling device G where a final drying and cooling took place.

Samples of the soybean particles and flakes were taken from each indivdual step or stage of this process, identified by the letters A through G above, and the following values were determined:

1. Bulk Weight. The determination of this value was accomplished by using the apparatus of Boehme according to the German Industrial Standard (DIN) 1060.

2. Water Content. The percent by weight of water was carried out by the standard method described in "DGF-Einheitsmethode" B-II3(52). Here, the soybean sample is weighed to an accuracy of ±0.05 grams and is then dried for 3 hours at 105° C. The sample is again weighed after cooling down to the original temperature in a desiccator. The weight loss determined in this manner is given as the water content.

3. Lecithin Content (after extraction with hexane). The total content of lecithin based on the content of phosphorus (P X 30-%) in the extracted oil and also the residual content after delecithinizing the oil with water were determined by the "A.O.C.S. Official Method" Ca 12-55, reapproved 1973, for "Sampling and Analysis of Commercial Fats and Oils".

The resulting measurements of these values are summarized in the following table:

| Step or Stage | Water Content % by Wt. | Bulk Weight kg/m³ | Lecithin in the Extracted Oil | |
|---|---|---|---|---|
| | | | Total (P × 30) % by Wt. | Residue after Delecithinizing % by Wt. |
| A | 12.0 | 680 | 2.43 | 0.35 |
| B | 11.9 | 286 | 2.59 | 0.37 |
| D | 15.2 | 319 | 3.09 | 0.16 |
| E1 | 14.8 | 348 | 3.40 | 0.06 |
| E2 | 14.5 | 395 | 3.23 | 0.041 |
| E3 | 14.3 | 413 | 3.98 | 0.029 |
| E4 | 14.1 | 440 | 4.05 | 0.029 |
| E5 | 14.2 | 426 | 4.02 | 0.032 |
| E6 | 13.7 | 438 | 3.79 | 0.034 |
| F | 11.5 | 465 | 4.11 | 0.029 |
| G | 11.7 | 461 | 3.94 | 0.033 |

These results clearly disclose a gradual increase of the bulk weight over the six treatment stages of the tower (E1 to E6), reaching the required minimum bulk weight of 400 kg/m³ at about the second to third stage of the heating tower. The discharge conveyor further compacts the treated flakes to a maximum of about 465 kg/m³ with only a slight loss of this high bulk weight after cooling and residual drying.

The above table also proves that a larger amount of lecithin is recovered by the hexane extraction as the bulk weight increases, i.e. the final soybean meal has a correspondingly smaller content of lecithin. The total yield of lecithin was about 1.2% by weight, with reference to the soybeans, compared to the usual 0.68% yield found in conventional extraction processes. The bitter taste of the final meal product appears to be associated with its lecithin content since this bitter taste remains and is still detectable by skilled tasters if one attempts to omit the slow compacting and heat treating procedure of the present invention.

EXAMPLE 3

This was a comparison test, using the same soybean flakes available after the moisturizing step of stage D of Example 2, but then introducing these flakes into a vibration mixer of Stork Amsterdam B.V. (as illustrated in FIG. 1 of U.S. Pat. No. 4,045,879). The vibration frequency used in this experiment was 250 vibrations/minute, the height of the flake material was 8 cm., and the steam temperature was 100° C. The treatment time amounted to 10 minutes. The treated flakes were recovered and extracted with hexane in the same manner as in Example 2. An evaluation of the treated material showed a bulk weight of only 320 kg/m³ since the vibrations tend to open up the flakes rather than causing a compacting. The lecithin content in the extracted crude oil before delecithinizing amounted to 2.86% by wt. and the residual content after delecithinizing amounted to 0.21% by wt. These values showed that much less lecithin was actually removed from the soybean flakes by the extraction while the residual content of lecithin in the extracted soybean oil after the delecithinizing step was much higher, i.e. by comparison to Example 2 above.

It was not possible to observe any significant reduction in the bitter taste of the final soybean meal product, even though the same extraction procedure was followed as in Example 2.

Slight variations in the temperature of treatment (95°–105° C.), changes in the vibration frequency (200–400 vibrations per minute) and variations in the retention time (3 to 10 minutes) do not produce any significant change in the results when working according to the Witte patent. Therefore, this technique of subjecting the flakes to a "loosening treatment" fails to give improved results comparable to the present invention, either in terms of achieving a bulk weight above 400 kg/m³ or an improved extraction of lecithin and bitter components from the soybean meal.

The process herein departs from the previously known processes by the rapid moistening of the soybean flakes to raise their water content to 12–25% by weight, preferably 14–20% by weight and immediately subjecting the moistened flakes to a heat treatment under a slow, compacting mixing at 90° to 120° C., preferably 95° to 110° C., for a period of about 10 minutes to about 90 minutes, preferably about 10 minutes to 45 minutes. The heat treatment and moistening may be carried out in a common zone by exposing the soybean pieces to steam, preferably while the pieces are mechanically agitated, until the pieces are heated to 90° to 120° C. The condensed steam supplies the moisture in this instance. In a separate moistening step, the pieces may be moistened by steam or may be immersed in or sprayed with water to attain the requisite moisture increase, after which they are heat treated.

In the foregoing examples, the soybean flakes were moistened in a first high-speed paddle mixer by the direct application of steam. Substantially all of the heat treatment and the drying of the moistened flakes to their indicated moisture content then took place as the soy flakes moved downwardly through the tower, prior to extraction of the lecithin and other components with the non-polar solvent. In order to improve the yield of lecithin and to carefully separate those components which cause a bitter taste, it is essential to compact the flakes during the heat treatment stages so as to attain the required minimum bulk weight. Otherwise, the amount of lecithin extracted from the soybeans is much lower and the bitter taste of the final meal product cannot be avoided.

The invention is hereby claimed as follows:

1. A method for producing edible soybean meal substantially free from bitter taste which comprises moistening oil-containing pieces of soybeans in the form of crushed and rolled flakes to raise the water content thereof to 12–25% by weight and heat treating the moistened flakes at temperatures in the range of 90 to 120° C. for about 10 to 90 minutes while subjecting the flakes to a mechanical compacting movement sufficient to attain a minimum bulk weight of said flakes of at least about 400 kg/m³, thereafter extracting soybean oil from the heat treated flakes having said minimum bulk weight with a non-polar solvent, separating the soybean flakes after extraction of the oil therefrom from the bulk of the extracting solvent, and drying the separated solvent-wetted soybean flakes by vaporizing the residual solvent therefrom to obtain a soybean meal substantially free from bitter taste.

2. A method as claimed in claim 1 wherein the heat treated flakes are dried to a moisture content of 8% to 14% by weight before the extraction.

3. A method as claimed in claim 1 wherein said pieces are moistened to raise their water content to 14% to 20% by weight.

4. A method as claimed in claim 1 wherein the heat treatment is carried out at temperatures in the range of 95° to 110° C.

5. A method as claimed in claim 1 wherein said flakes are moved mechanically during the moistening and heat treatment thereof, during which said flakes attain a bulk weight of at least 500 kg/m³.

6. A method as claimed in claim 1 wherein said non-polar solvent is one or more hydrocarbons having 5 to 12 carbon atoms.

7. A method as claimed in claim 1 wherein said flakes are moistened by direct application of steam.

8. A method as claimed in claim 1 wherein the residual solvent is evaporated from said flakes during toasting of said flakes carried out at temperatures of about 102° to 105° C.

9. A method as claimed in claim 1 wherein the compacting movement is achieved with a paddle mixer having a rotational speed of less than about 60 r.p.m.

10. A method as claimed in claim 9 wherein said rotational speed is about 10 to 30 r.p.m.

* * * * *